US005812331A

United States Patent [19]
Lopez et al.

[11] Patent Number: 5,812,331
[45] Date of Patent: Sep. 22, 1998

[54] REFLECTOR FOR A POLARIMETRIC RADAR IN PARTICULAR FOR USE AS A CALIBRATOR OR AS A BEACON

[75] Inventors: Jean-Marc Lopez, Corronsac; Patrick Dumon, Vigoulet-Auzil; Henri-José Mametsa, Castenet-Tolosan; Florent Christophe, Pin Balma; Pierre Borderies; Jean-Claude Souyris, both of Toulouse, all of France

[73] Assignee: Centre National d'Etudes Spatiales, Paris, France

[21] Appl. No.: 464,694

[22] PCT Filed: Dec. 7, 1993

[86] PCT No.: PCT/FR93/01204

§ 371 Date: Jul. 24, 1995

§ 102(e) Date: Jul. 24, 1995

[87] PCT Pub. No.: WO94/14211

PCT Pub. Date: Jun. 23, 1994

[30] Foreign Application Priority Data

Dec. 8, 1992 [FR] France .................................. 92 14784

[51] Int. Cl.[6] .............................. G02B 5/10; H01Q 15/00

[52] U.S. Cl. .............................. 359/868; 359/867; 356/3; 356/255; 343/914; 343/912; 343/895; 342/47

[58] Field of Search .................................... 359/868, 867; 356/3, 255; 343/914, 912, 895; 342/47

[56] References Cited

U.S. PATENT DOCUMENTS 4,823,131 4/1989 Bell ............................................ 342/7

FOREIGN PATENT DOCUMENTS 1201934 12/1985 U.S.S.R. ................................ 343/912

*Primary Examiner*—Paul M. Dzierzynski
*Assistant Examiner*—Mohammad Y. Sikder
*Attorney, Agent, or Firm*—Blakely Sokoloff Taylor & Zafman

[57] ABSTRACT

A reflector is constituted by a right pseudo-dihedral, a ridge (C) of which is in the form of a portion of a helix so as to provide a calibrator or a beacon.

6 Claims, 14 Drawing Sheets

REFLECTOR FOR A POLARIMETRIC RADAR IN PARTICULAR FOR USE AS A CALIBRATOR OR AS A BEACON

BACKGROUND OF THE INVENTION

1. Field of the Invention

The invention relates to reflectors for polarimetric radars, intended in particular for use in calibrating a radar or for use as a beacon.

2. Description of the Related Art

It is known to use a right dihedral made of metal with a rectilinear line of intersection or "ridge" for calibrating a polarimetric radar, but that technique requires the relative positions of the reflector and of the radar to be very precisely controlled so that the incident beam lies within one of the planes of symmetry of the dihedral, because of the extreme sensitivity of the response of the dihedral as a function of angle, and in particular as regards its equivalent radar area (E.R.A.) of cross-polarization.

The use of such a technique is therefore limited in practice to laboratory calibration.

Recent studies have been made of reflectors constituted by two conductive surfaces arranged as if they had been generated by displacing a right-angled V-shape along a curved path, such reflectors being called "right pseudo-dihedrals". The published studies have dealt more precisely with the cases of a circular ridge and of an elliptical ridge, which can improve the reflective characteristics and facilitate the use of the reflector, as explained in the study "Theoretical and Experimental Study of a Crosspolarization S.A.R. Calibrator" by J. C. Souyris, P. Borderies, P. F. Combes and H. J. Mametsa, published in the proceedings of the SECOND INTERNATIONAL WORKSHOP ON RADAR POLARIMETRY (Nantes, September 1992), but those solutions do not provide improvement of all desired performance measures simultaneously, and compromise is therefore required.

SUMMARY OF THE INVENTION

The present invention provides a right pseudo-dihedral radar reflector which gives improvement of all desired performance measures simultaneously.

One object of the invention is to provide a pseudo-right dihedral radar reflector which makes on-site calibration possible, in the presence of on-board antennae, the orientation of which is known with approximate accuracy.

A further object of the invention is to provide a right pseudo-dihedral radar reflector which backscatters a sufficient level of cross-polarization energy in as wide a solid angle as possible, this being of particular benefit for beacon and for identification.

A still further object of the invention is to provide a right pseudo-dihedral radar reflector suitable for constituting a cross-polarization standard having as constant a response as possible over a given angular domain.

An object of the invention is also to provide a right pseudo-dihedral radar reflector having a cross-polarization pattern which is angularly enlarged without its pattern being modulated by undesirable ripple.

All these objects are attained in the invention when the ridge of the right pseudo-dihedral is in the form of a portion of a helix.

Preferably, the ridge extends over no more than one spiral turn of the helix.

Preferably, the tangent at a point of the helix subtends an angle of 45° with the axis of the helix.

The orientation of the V during its theoretical displacement along the ridge varies in accordance with a relationship chosen as a function of the given trajectory of the polarimetric emission-reception system.

This reflector, placed in front of a polarimetric radar, i.e. a radar whose emission and reception take place along two orthogonal linear polarizations H and V., allows the radar to be calibrated in cross-polarization; H emission—V reception or V emission—H reception, and this takes place over a large angular range without requiring a change in the orientation of the dihedral.

This reflector, which may be made entirely of metal, allows a radar to be calibrated at an airport or a heliport, or situated on any type of vehicle (for example, a satellite), or on a tower, providing the radar lies in the angle of the calibration cone coming from the reflector.

BRIEF DESCRIPTION OF THE DRAWINGS

The invention is explained below by means of comparative examples, with reference to the figures in the accompanying drawings which show other characteristics of the invention, and in which.

DETAILED DESCRIPTION OF THE INVENTION

The quantities which define the structure constituted by a reflector of the invention are the length $\underline{a}$ of the generator line or "generatrix" (i.e. the length of the side of the V, the displacement of which theoretically generates a face of the dihedral), the radius of curvature $\underline{r}$ of the ridge, and the angle $\psi_o$ of the angular portion of the helix determined by the ridge.

Figure 1:
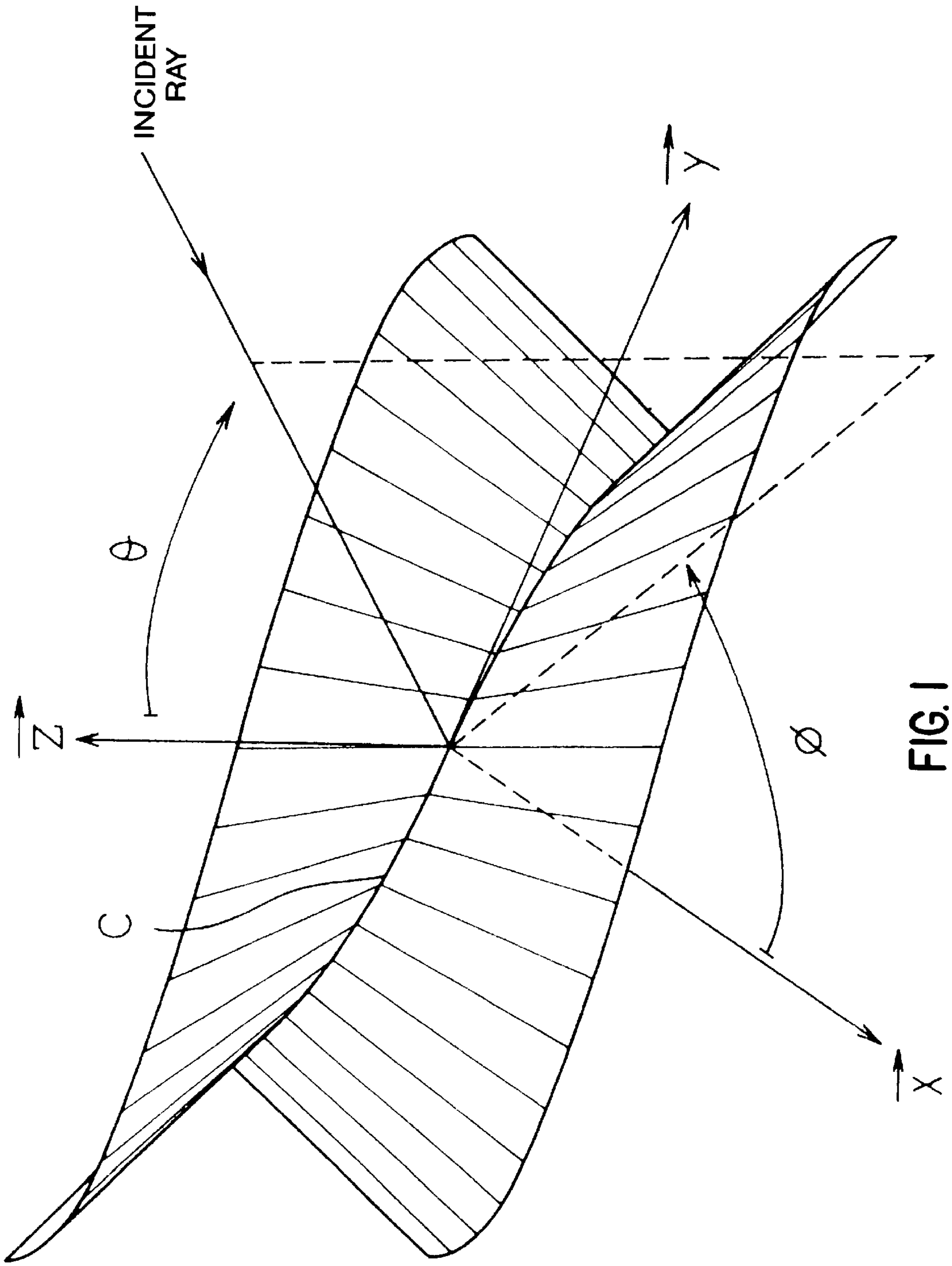
FIG. 1 is a diagram of a reflector in accordance with the invention.
Figure 2:
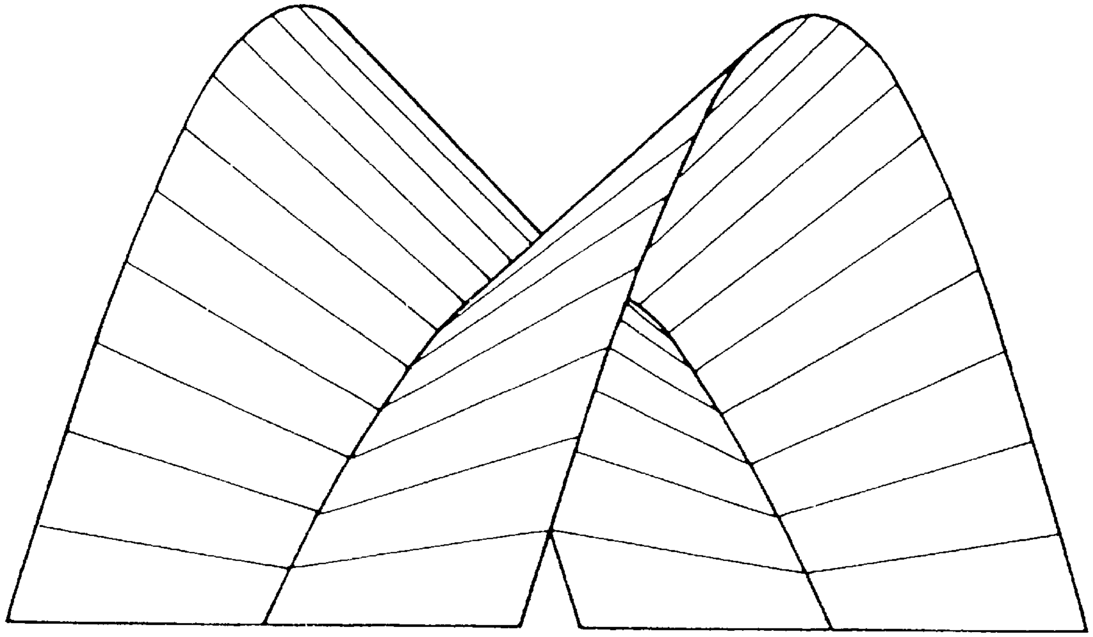
FIGS. 2 and 3 are other views of the same reflector.
Figure 4:
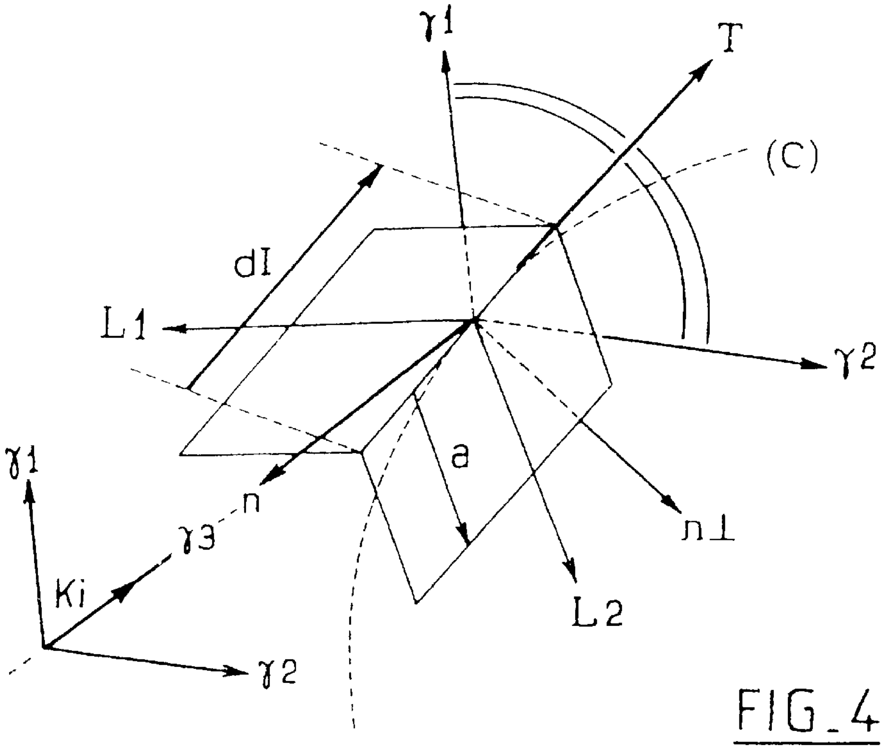
FIG. 4 is a diagram of a unit dihedral which is useful to an understanding of the definition of the reflector of FIGS. 1 to 3.
Figure 3:
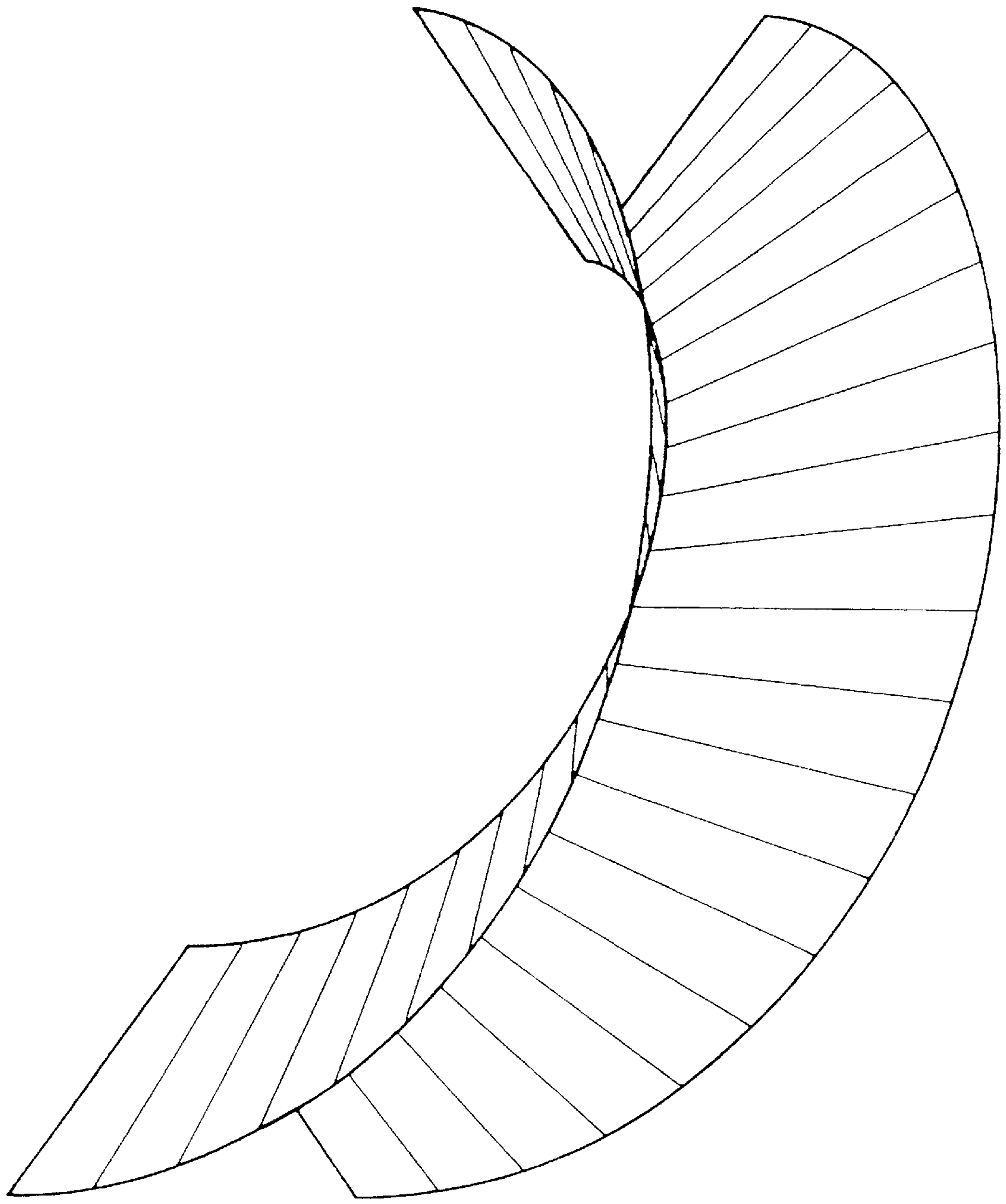

The reflector represented in FIGS. 1 to 3 is such that the tangent T at each point of its helical ridge (c) subtends an angle of 45° with the axis of the helix, and for a given trajectory of the polarimetric emission-reception system, there is a unit right dihedron (FIG. 4) which simultaneously satisfies the following conditions:

The bisector $\pi$ of its two generatrices L1 and L2 is colinear with the incident Poynting vector Ki (carried by $\gamma 3$) (Condition $\alpha$);

Its ridge of length [|d1|] and tangent T is colinear with the bisector of the vectors [$\gamma 1$, $\gamma 2$] which are the directions of the electrical fields emitted by the polarimetric system (Condition $\beta$).

By satisfying conditions $\alpha$ and $\beta$, maximum detection in cross-polarization is ensured, and the parametric equation of the optimum surface for the trajectory in question can be obtained.

The trajectory under consideration is that which corresponds to a section $\phi$=45° for incidences $\theta$ varying about the normal Z.

The structure has been synthesized so as to fix, in a completely uncorrelated manner, a level of cross-polarization E.R.A. (proportional to the quantity $a^2 \cdot r^2/\lambda^2$) over an angular range $\Delta\theta$ proportional to the aperture $\psi_o$.

Figure 6:
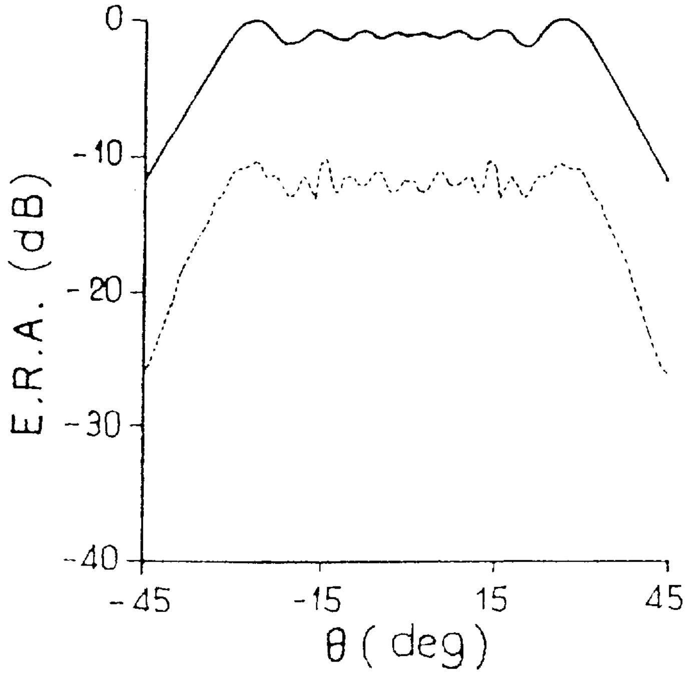
Figure 7:
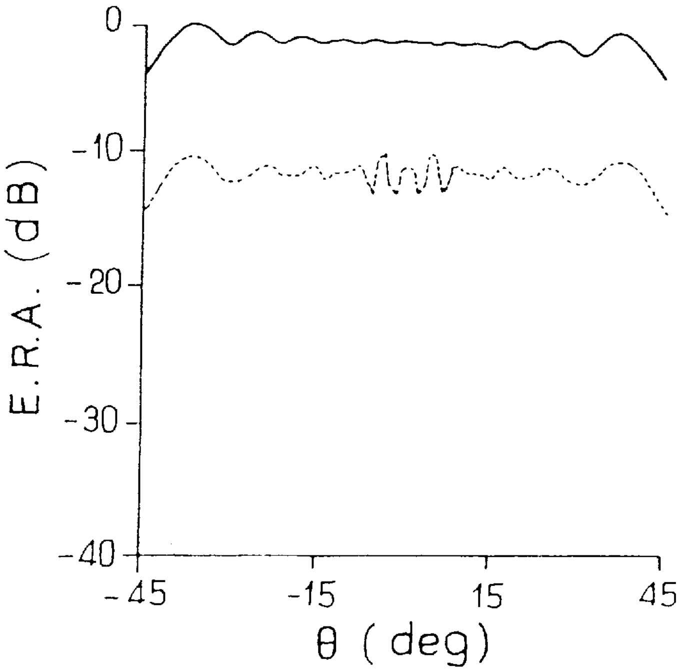
Figure 8:
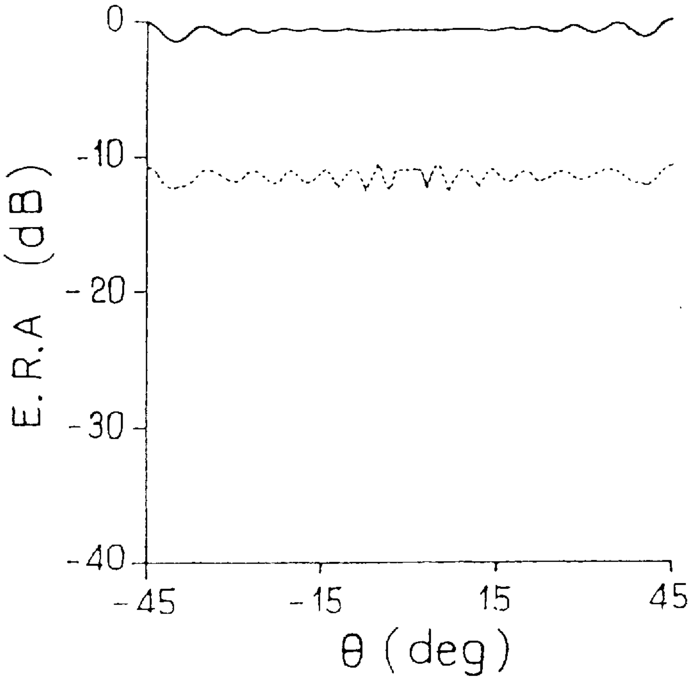
Figure 9:
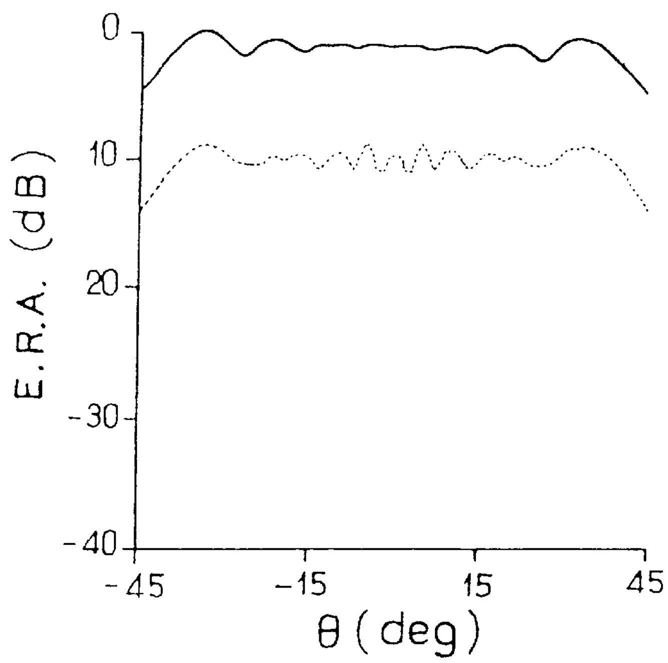
Figure 10:
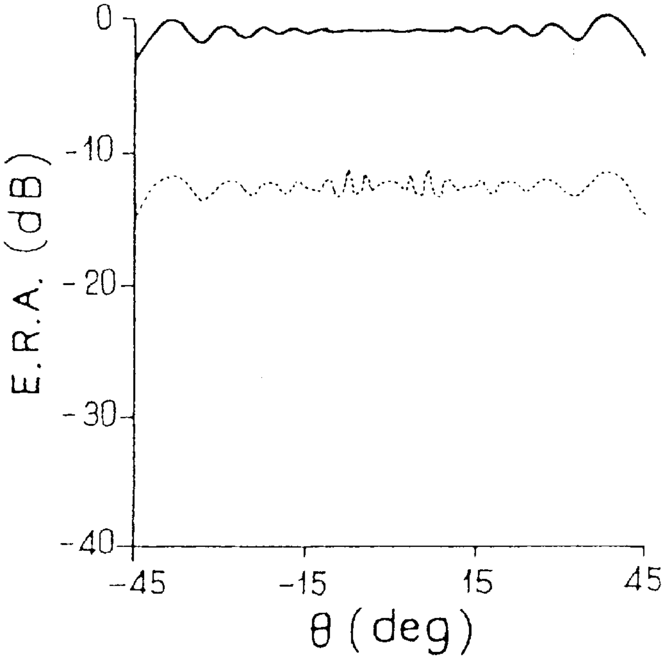

In considering the optimum trajectory characterized in the base co-ordinate system (X,Y,Z) for a section at $\phi$=45°, FIGS. 5 to 10 represent the variations in the E.R.A of copolarization (lower curve) and of counter-polarization (upper curve) for $\phi$=45° for different reflectors characterized by $\psi_o$ and r/$\lambda$. These curves have been normalized with respect to the maximum level of backscattered energy from the reflector under consideration (i.e. with respect to the quantity $r^2/\lambda^2$). For the curves of FIGS. 5 to 8, a/$\lambda$=5, r/$\lambda$=15 whilst $\psi_o$ has the value 60° (FIG. 5), 80° (FIG. 6), 100° (FIG. 7) and 120° (FIG. 8). For the curves of FIGS. 9 and 10, a/$\lambda$=5, $\psi_o$=100° and r/$\lambda$=10 (FIG. 9) or 20 (FIG. 10). It can be seen that the cross-polarization pattern as a function of aperture $\psi_o$ is enlarged.

A comparison of the curves of FIGS. 7, 9 and 10 illustrates the influence of variations in the parameter r/$\lambda$ with $\psi_o$ fixed. Irrespective of its incidence in absolute terms, r has little effect on the shape of the pattern. However, a small reduction in the ripple can be seen with increasing r. Nevertheless, this is influenced more by $\psi_o$. In fact, this interference phenomenon is smaller in reflectors where $\psi_o$ is large. The level of copolarization for all these structures remains stable at levels of about −10 dB.

Figure 11A:
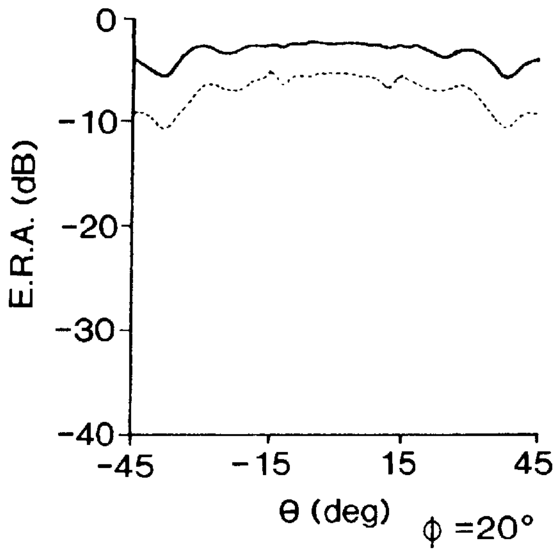
FIG. 11 shows the variation in the area E.R.A as a function of the angle of the section plane, these being respectively for angles of 20° (FIG. 11A), 30° (FIG. 11B) and 60° (FIG. 11C), for a reflector having an 80° aperture.
Figure 11B:
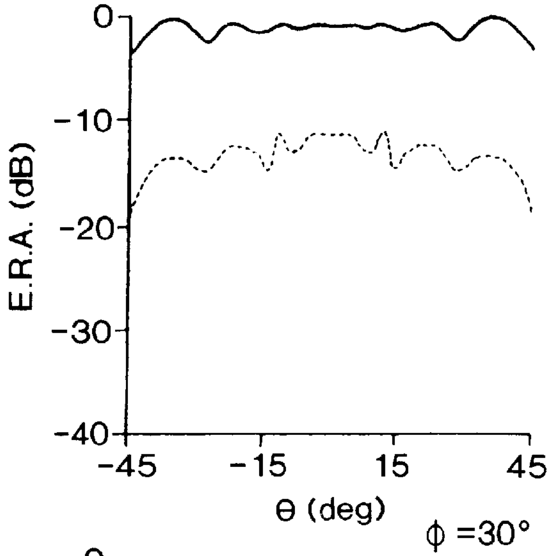
Figure 11C:
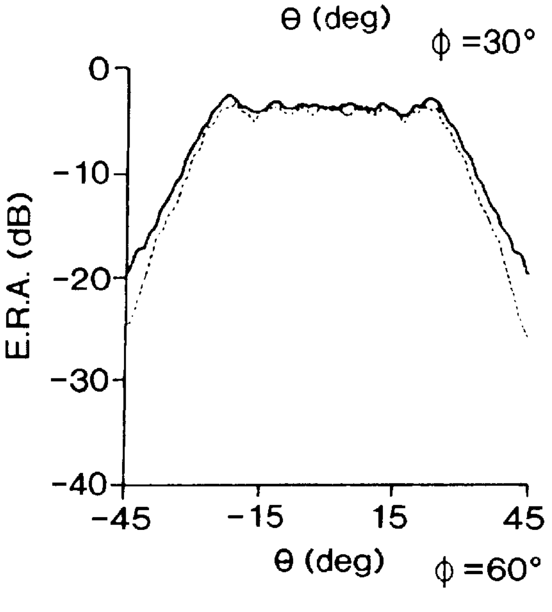
Figure 12A:
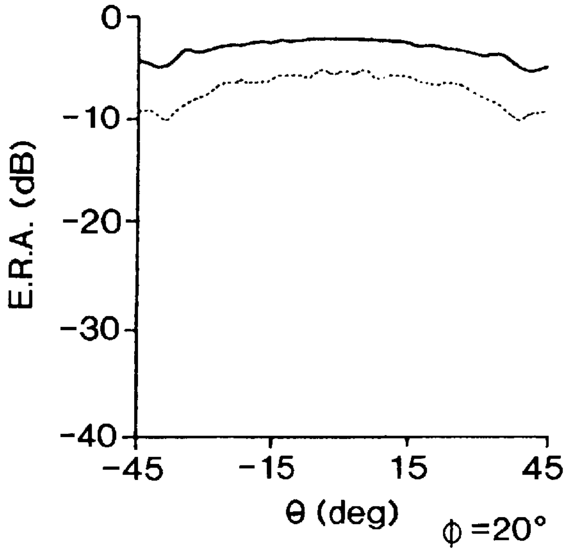
FIG. 12 is similar to FIG. 11 but for a reflector having a 100° aperture.
Figure 12B:
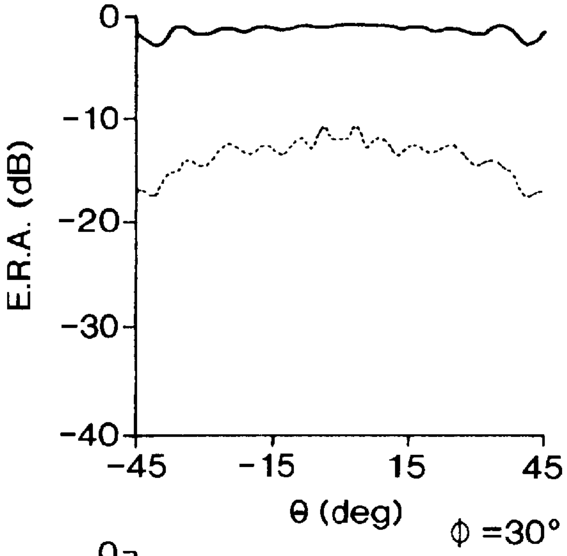
Figure 12C:
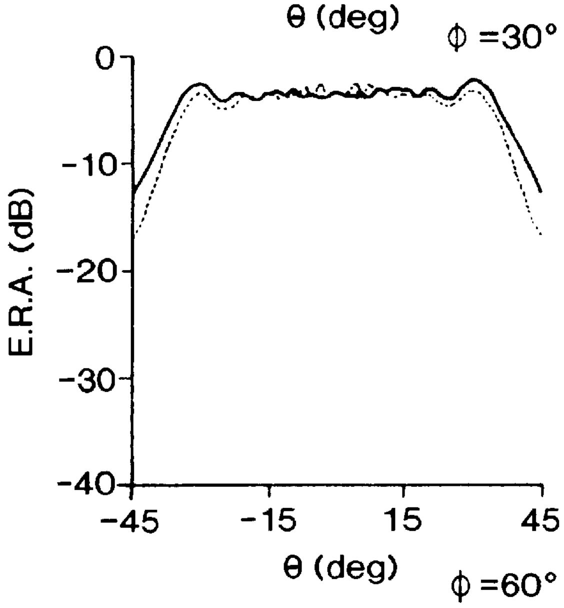
Figure 13:
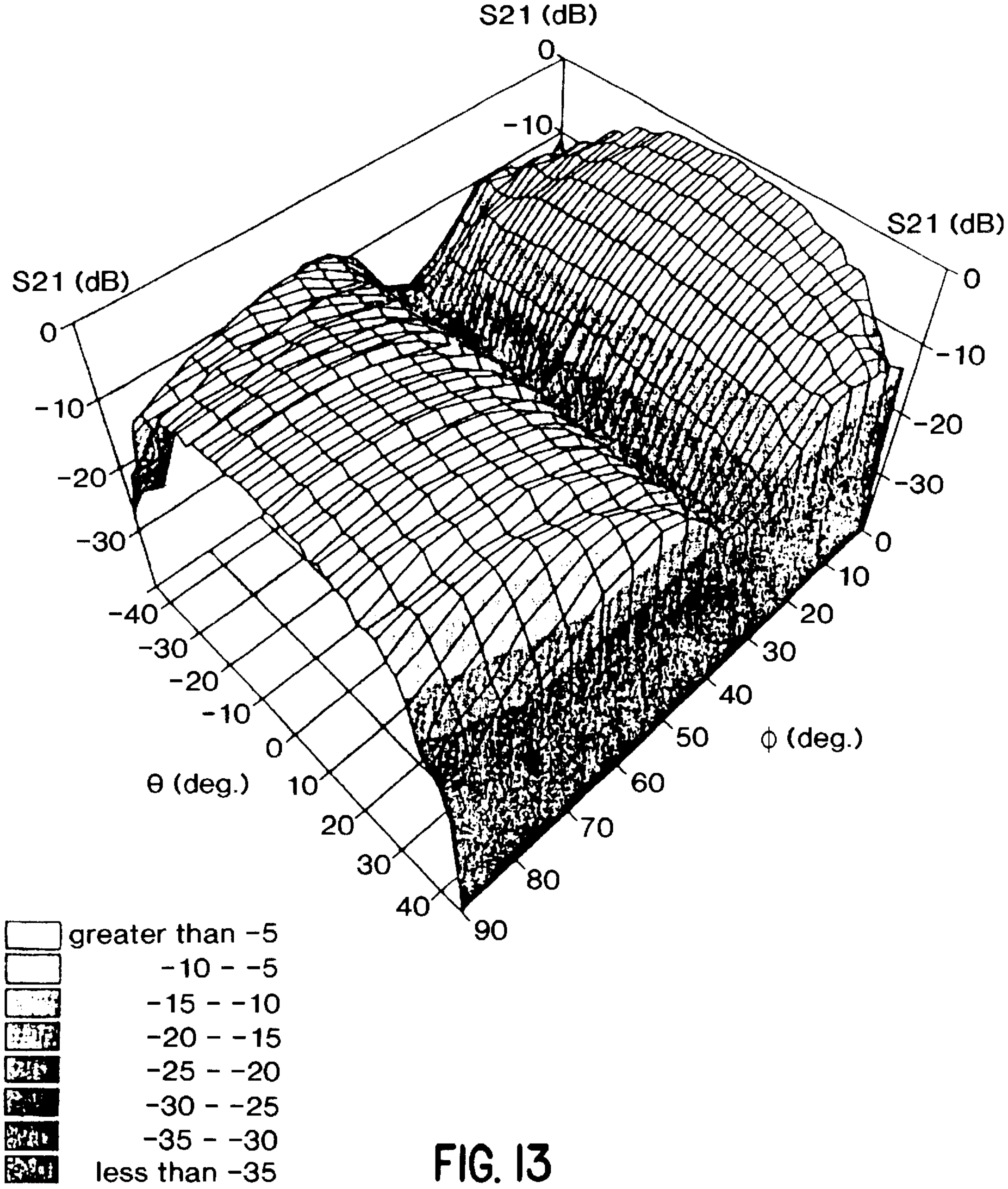
FIGS. 13 and 14 are simulations of the variations in the levels of co- and counter-polarization as a function of the orientation of the incident beam for a reflector of the invention.
Figure 14:
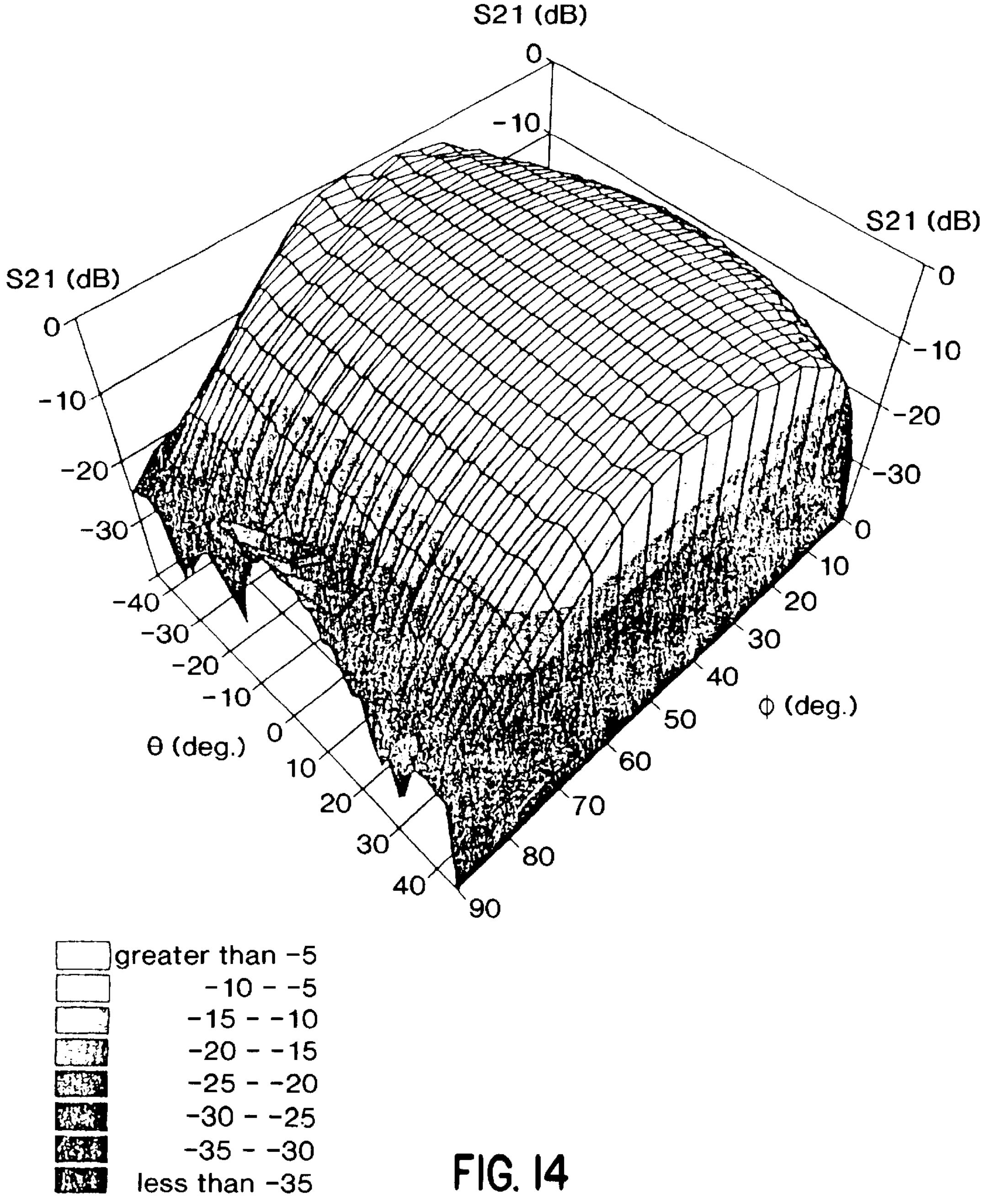

FIGS. 11 and 12 represent patterns of co- and counter-polarization (lower and upper curves respectively), for sections where $\phi$=20°, $\phi$=30° and $\phi$=60° and they show the asymmetry in the behavior of the structure relative to the plane $\phi$=45°. This is explained by the helical nature of the ridge. FIGS. 11A and 12A show that for $\phi$=20°, the backscattering properties remain usable, although there is a rise in the copolarization level. This may generally be undesirable if the emission antennas operating with two orthogonal polarizations have significant coupling. Finally, FIGS. 13 and 14 represent simulations of the co- and counter-polarization levels for different values of the relative bearing $\phi$ and of the co-latitude $\theta$ of the direction of the incident radiation dB, for the case of the pseudo-dihedral with helical ridge defined by: a=5$\lambda$, r=15$\lambda$, $\psi_o$=120°.

By way of comparison, the following Table shows the characteristic results of backscattering in counter-polarization, as obtained with reflectors having ridges of various forms:

| | Section $\phi$ = 45° opening $\Delta\theta$ (3 dB) | Ripple [max-max] about $\phi$ = 45° | Aperture $\Delta\theta$ (3 dB) about $\phi$ = 45° | Maximum E.R.A. level ($dBm^2$) |
|---|---|---|---|---|
| Dihedral with rectilinear ridge a = b = 5λ | 7° | | 50° | 13.47 |
| right pseudo-dihedral with circular ridge a = b = r = 5λ | 60° | 3.5 dB | 50° | 2 |
| right pseudo-dihedral with elliptical ridge a = r = 5λ e = 0.8 $\psi_o$ = 60° | 30° | 1.5 dB | 50° | 2 |
| right pseudo-dihedral with helical ridge a = 5λ r = 15λ $\psi_o$ = 120° | 90° | <1 dB | 60° | 10 |

The parameters of the dihedrals mentioned in this table by way of example are defined below:

dihedral with rectilinear ridge:

a = length of sides
b = length of ridge right pseudo-dihedral with circular ridge:

a = length of sides
b = length of ridge
r = radius of curvature of ridge right pseudo-dihedral with elliptical ridge:

a = length of sides
r = length of small axis of ellipse of ridge
e = eccentricity of ellipse.

Figure 15:
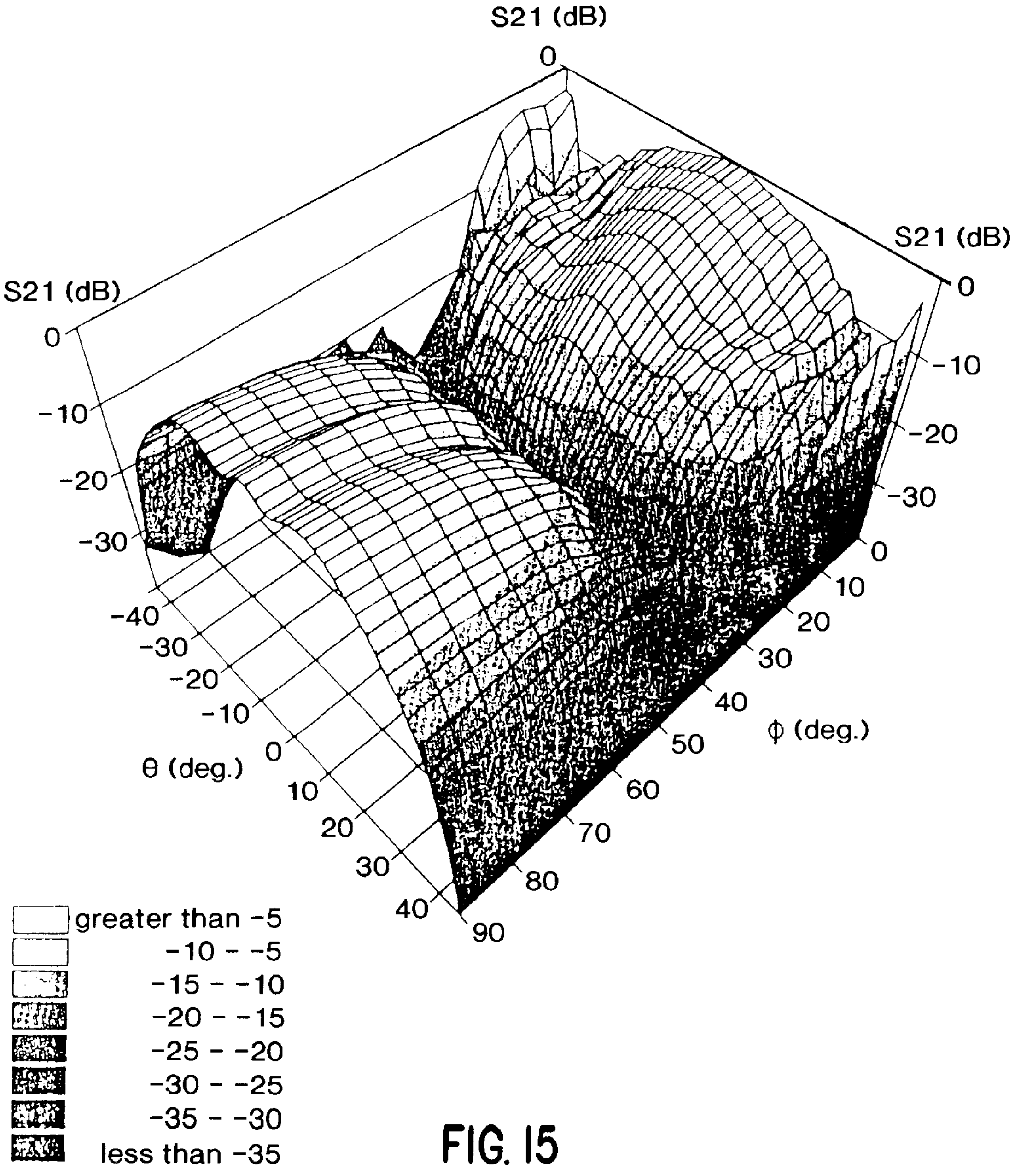
FIGS. 15 and 16 are simulations comparable to FIGS. 13 and 14 respectively, for the case of a pseudo-right dihedral with a circular ridge.
Figure 16:
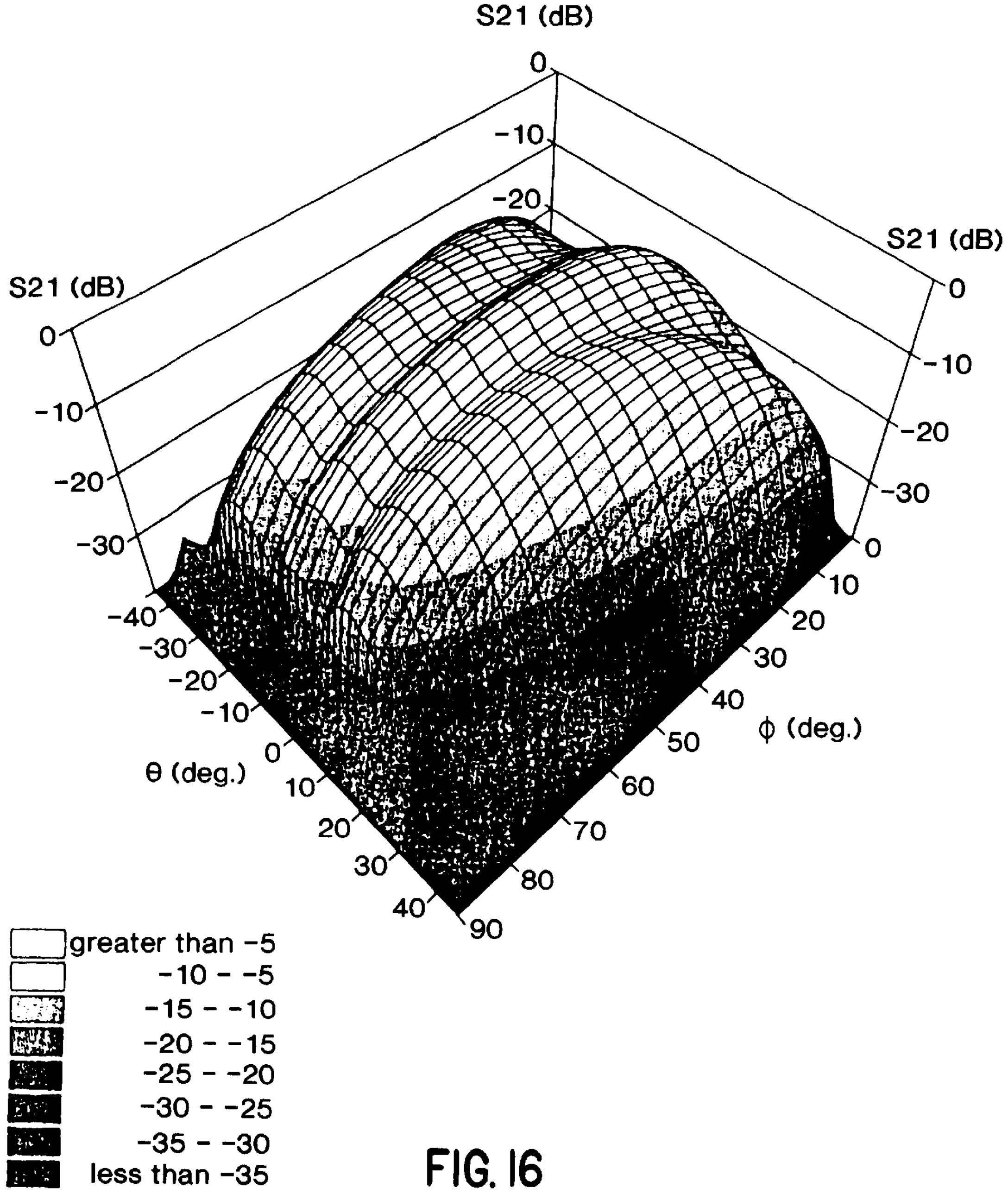

FIGS. 15 and 16 respectively show the variations in $[S11]^2$ and $[S21]^2$, for a right pseudo-dihedral with a circular ridge defined by a=5λ, b=5λ, r=4.75λ, for different values of the angles $\theta$ and $\phi$ which define the orientation of the waves of TE mode.

Figure 17:
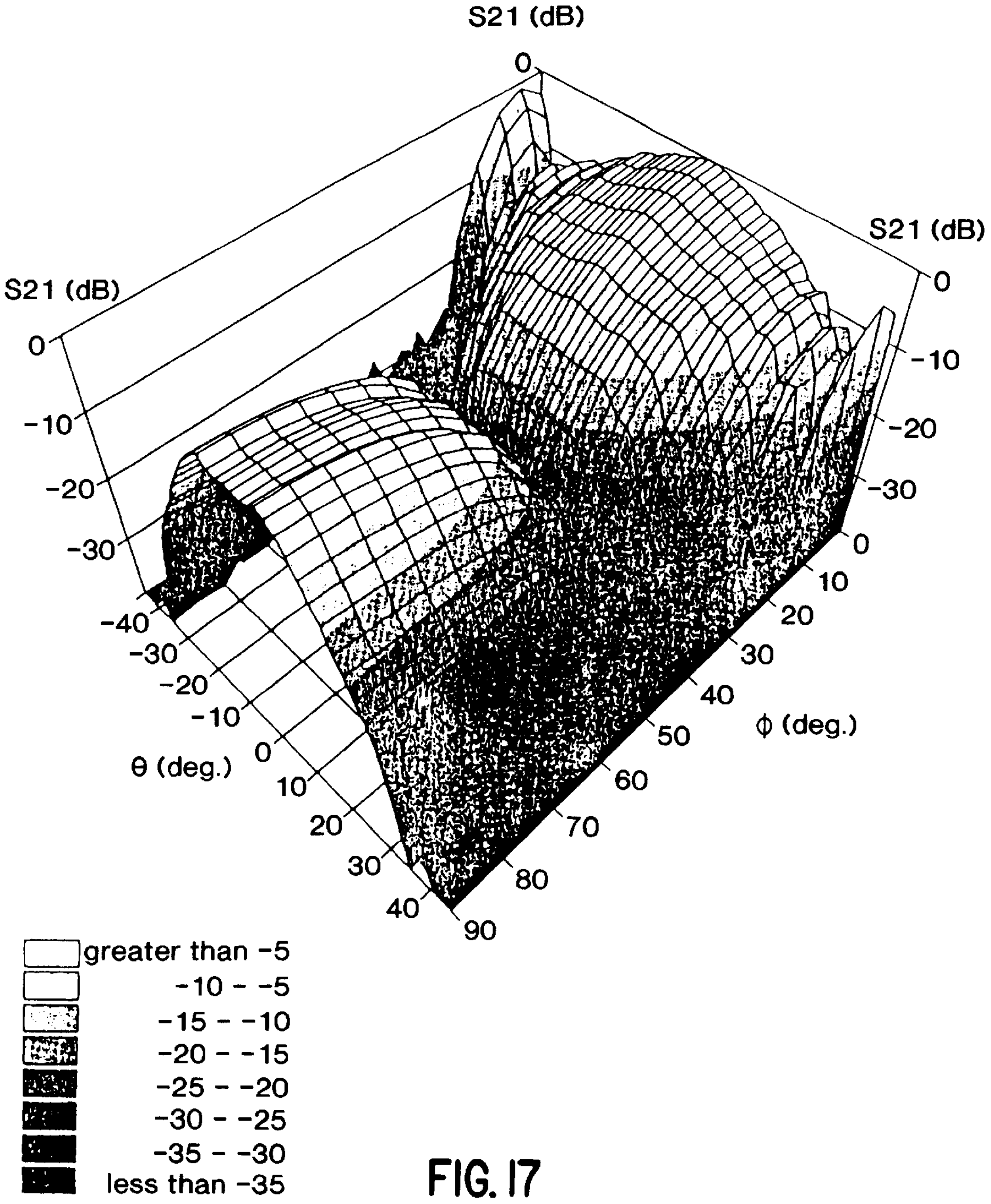
FIGS. 17 and 18 are simulations, comparable to FIGS. 13 and 14 respectively, for the case of a pseudo-right dihedral with an elliptical ridge.
Figure 18:
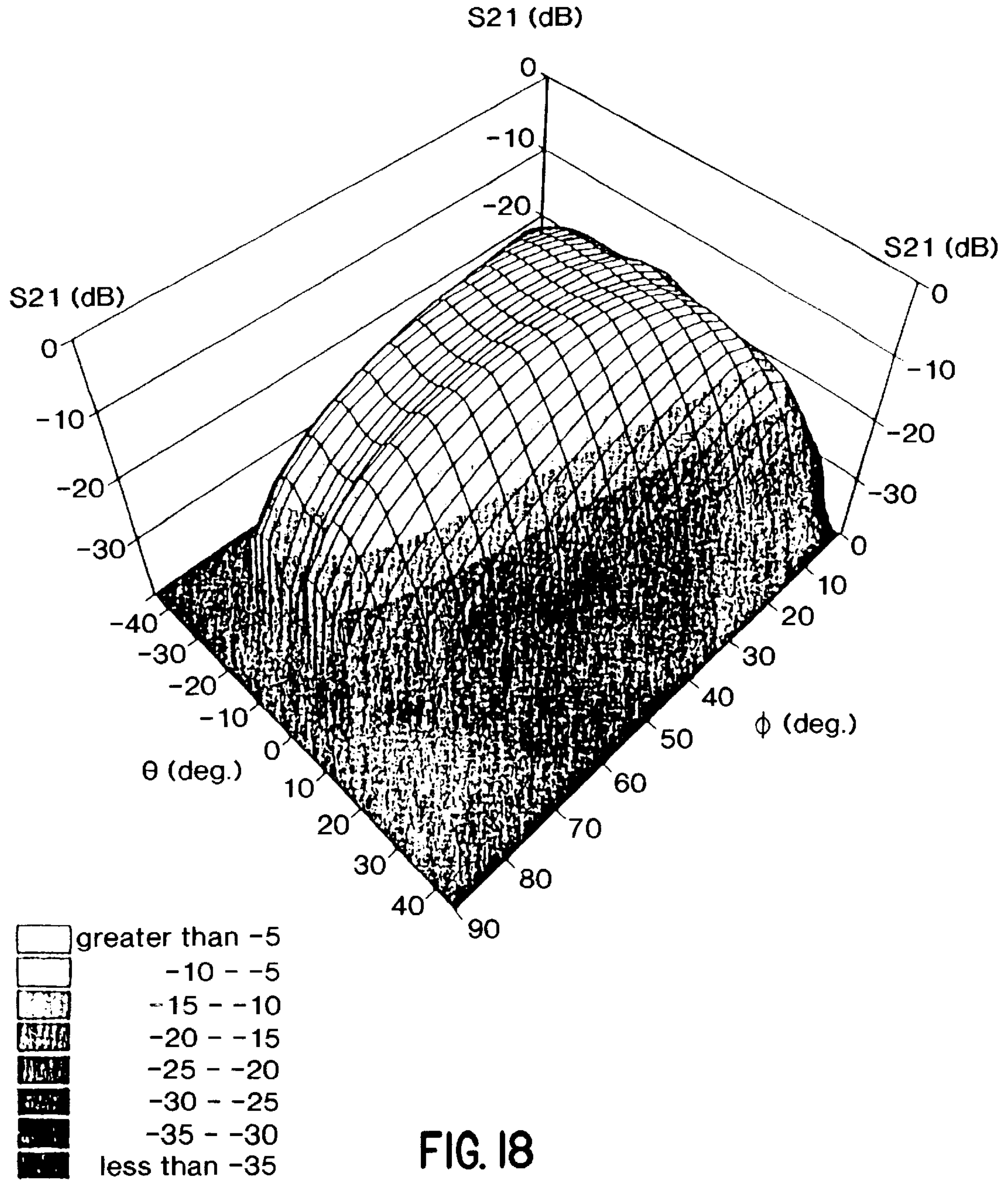

FIGS. 17 and 18 respectively show the variations in $[S11]^2$ and $[S21]^2$, for a right pseudo-dihedral with an elliptical ridge defined by a=5λ, r=5λ, $\phi$=76° e=0.6, for different values of the angles $\theta$ and $\phi$, in TE mode.

These figures should be compared with the corresponding FIGS. 13 and 14 for the case of a pseudo-right dihedral with a helical ridge in accordance with the invention.

Figure 5:
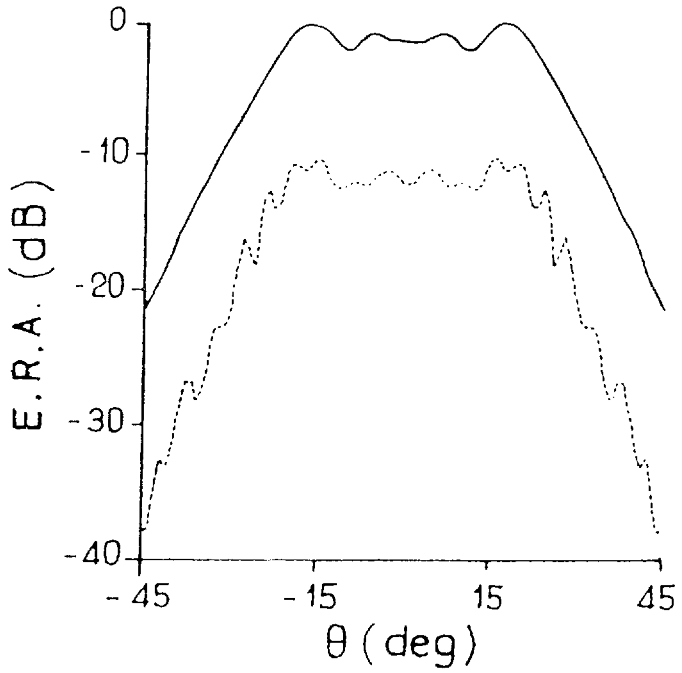
FIGS. 5 to 10 are patterns which show the variation in the equivalent radar area (E.R.A) of co- and counter-polarization of a reflector of the invention, as a function of the radius of curvature $\underline{r}$ of the ridge and of the aperture $\psi_o$ of the reflector, in the plane $\phi$=45° (TE emission)

The legends for FIGS. 5 to 18 are as follows:

FIG. 5: Pattern of co- and counter-polarization E.R.A. of the dihedral with helical ridge, in the plane $\phi$=45°, TE emission, a/λ=5, $\psi_o$=60°, r/λ=15, (________X-POL, . . . CO-POL);

FIG. 6: Pattern of co- and counter-polarization E.R.A. of the dihedral with helical ridge, in the plane $\phi$=45°, TE emission, a/λ=5, $\psi_o$=80°, r/λ=15, (________X-POL, . . . CO-POL);

FIG. 7: Pattern of co- and counter-polarization E.R.A. of the dihedral with helical ridge, in the plane $\phi$=45°, TE emission, a/λ=5, $\psi_o$=100°, r/λ=15, (________X-POL, . . . CO-POL);

FIG. 8: Pattern of co- and counter-polarization E.R.A. of the dihedral with helical ridge, in the plane $\phi$=45°, TE emission, a/λ=5, $\psi_o$=120°, r/λ=15, (________X-POL, . . . CO-POL);

FIG. 9: Pattern of co- and counter-polarization E.R.A. of the dihedral with helical ridge, in the plane $\phi=45°$, TE emission, $a/\lambda=5$, $\psi_o=100°$, $r/\lambda=15$, (________X-POL, . . . CO-POL);

FIG. 10: Pattern of co- and counter-polarization E.R.A. of the dihedral with helical ridge, in the plane $\phi=45°$, TE emission, $a/\lambda=5$, $\psi_o=100°$, $r/\lambda=15$, (________X-POL, . . . CO-POL);

FIG. 11: Pattern of co- and counter-polarization E.R.A. of the dihedral with helical ridge, $a/\lambda=5$, $\psi_o=80°$, $r/\lambda=15$, TE emission, (________X-POL, . . . CO-POL);

FIG. 12: Pattern of co- and counter-polarization E.R.A. of the dihedral with helical ridge, $a/\lambda=5$, $\psi_o=100°$, $r/\lambda=15$, TE emission, (________X-POL, . . . CO-POL);

FIG. 13: Variation in $(s11)^2$ for the dihedral with helical ridge for different values of $\theta$ and $\phi$, $a/\lambda=5$, $r/\lambda=15$, $\psi_o=120°$. TE mode;

FIG. 14: Variation in $(s21)^2$ for the dihedral with helical ridge for different values of $\theta$ and $\phi$, $a/\lambda=5$, $r/\lambda=15$, $\psi_o=120°$. TE emission, TM reception;

FIG. 15: Variation in $(s11)^2$ for the dihedral with circular ridge for different values of $\theta$ and $\phi$, $a/\lambda=5$, $b/\lambda=5$, $r/\lambda=4.75$. TE mode;

FIG. 16: Variation in $(s21)^2$ for the dihedral with circular ridge for different values of $\theta$ and $\phi$, $a/\lambda=5$, $b/\lambda=5$, $r/\lambda=4.75$, TE emission, TM reception;

FIG. 17: Variation in $(s11)^2$ for the dihedral with elliptical ridge for different values of $\theta$ and $\phi$, $a/\lambda=5$, $r/\lambda=5$, $\psi_o=76°$, e=0.6, TE mode;

FIG. 18: Variation in $(s21)^2$ for the dihedral with elliptical ridge for different values of $\theta$ and $\phi$, $a/\lambda=5$, $r/\lambda=5$, $\psi_o=76°$, e=0.6, TE emission, TM reception.

We claim:

1. A reflector for a polarimetric radar, the reflector being constituted by two conductive surfaces arranged as if they had been generated by displacing a right-angled V-shape along a curved path thereby forming a right pseudo-dihedral, the reflector being characterized in that the ridge (C) of the pseudo-dihedral is in the form of a portion of a helix.

2. A reflector according to claim 1, characterized in that the ridge extends over no more than one spiral turn of the helix.

3. A reflector according to either of claims 1 or 2, characterized in that the tangent at each point of the helix subtends an angle of 45° with the axis of the helix.

4. A reflector according to claim 3 such that for a given trajectory of the polarimetric emission-reception system, there is a unit right dihedron which simultaneously satisfies the following conditions in the frame of reference [$\gamma1$, $\gamma2$, $\gamma3$] (FIG. 4):

the bisector $\pi$ of its two generatrices L1 and L2 is colinear with the incident Poynting vector Ki carried by $\gamma3$;

its ridge of length d1 is colinear with the bisector of the vectors [$\gamma1$, $\gamma2$] which correspond to the directions of the electrical fields emitted by the polarimetric system.

5. A reflector according to claim 1 adapted for use as a calibrator.

6. A reflector according to claim 1 adapted for use as a beacon.

* * * * *